Figure 1:
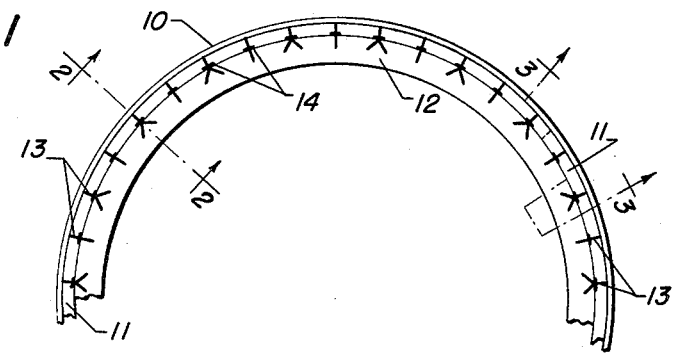

Feb. 12, 1963   W. C. HENSEL   3,077,058
INSULATED CHAMBER
Filed Dec. 30, 1957

INVENTOR:
Walter C. Hensel
BY: Chester J. Giuliani
Glen R. Grunewald
ATTORNEYS.

3,077,058
INSULATED CHAMBER
Walter C. Hensel, Palatine, Ill., assignor, by mesne assignments, to Universal Oil Products Company, Des Plaines, Ill., a corporation of Delaware
Filed Dec. 30, 1957, Ser. No. 706,015
5 Claims. (Cl. 50—331)

This invention relates to an insulated chamber and particularly to an insulated chamber useful in high temperature applications under mechanically severe conditions.

There are many types of insulated chambers in use ranging from simple ovens to complex chemical reactors. In most applications, and particularly simpler ones, the insulation is used primarily to conserve energy. Simple insulated chambers such as refrigerators and ovens conserve energy and usually are insulated simply by having a double wall which may contain inert packing material between the walls. Usually, both walls are metal and the packing material is employed to prevent the circulation of air in the void space. When extremely high temperatures are employed, it is necessary to insulate a chamber so that the metallic portions will not have their temperature limits exceeded. Under these conditions, the insulation on the interior of the chamber where the high temperatures exist cannot be metal and it is, therefore, necessary to have some heat-resistant refractory material connected to the metal wall or built within it which shields it from the high temperatures. Under high temperature conditions, continuous insulation or monolithic insulation such as insulating cement or concrete, etc. is difficult to use because the difference in expansion between the insulating material and the metal wall causes it to break loose from the metal wall. Furthermore, a sufficient thickness of monolithic insulation to adequately protect the metal chamber wall from extremely high temperatures imposes a severe structural strain on the chamber because of the high density of monolithic or cement-type insulation. In many insulated chambers for high temperature use, the insulation is soft light-weight material such as rock wool or other mineral wools, magnesia block, etc. These materials may be connected directly to the metal wall without imposing severe structural limitations on it or in the case of blocks, may be built as a separate self-supporting wall within the chamber. The use of soft light materials, however, is prohibited when the chamber contains a flowing fluid which would permeate the insulation and, therefore, destroy its insulating qualities or in cases where the flowing material contains solid particles, attrition will very rapidly remove the insulation from the interior chamber walls. It is an object of this invention to provide an insulated chamber with a light-weight insulation that is connected directly to the chamber walls which is capable of withstanding high temperatures, which is fluid impervious and resistant to attrition by solid particles.

In one embodiment, this invention relates to an insulated chamber comprising in combination an enclosing metal wall, a layer of soft light-weight insulating material in contact with said metal wall, a layer of hard monolithic insulating material in contact with said soft material and metal pin members fixed to said metal wall extending through said soft insulating material and embedded in said monolithic layer.

Briefly, this invention consists of an insulated chamber having a two component insulating material disposed within it and fixed to it. The chamber consists of an enclosure of metal walls which may have metal floor and ceiling when desired. The outside metal wall is protected from high temperature by an insulating material which completely encloses the interior of the chamber. The insulating material consists of a layer of soft light-weight insulation such as slag wool, rock wool, fiberglass, asbestos, magnesia, etc. which all have excellent insulating qualities and have the additional advantage of being light-weight and flexible. This material acts in a double capacity of insulating material and mechanical buffer for absorbing strains caused by differential expansion between the later described second layer of insulation and the metal wall. The buffering function of the soft insulating material is important both in respect to preventing breakage of the hard insulating material and with respect to preventing a separation of the insulation from the wall which it is protecting.

In contact with the light-weight soft insulating material and the material forming the interior surface of the chamber is a hard impervious monolithic layer of refractory material such as calcium aluminate, hydraulic cement, air-dried cement, any of the above containing aggregates such as calcined shale, vermiculite, perlite, etc. or any other of the insulating cements or concretes in common use. The monolithic refractory layer also has a double function in this invention. The first function is to provide insulation to keep the metal wall cool. The second function is to provide an impervious layer which is resistant to penetration by fluids, attrition by solids, corrosion by reagents, etc. thereby not only protecting the metal wall from heat but also from corrosion and protecting the soft insulating material from attrition. The layer of monolithic insulating material may be comparatively thin and, therefore, very light-weight since its insulating function is reinforced by the softer light-weight material between it and the metal wall. The monolithic insulating material should, however, be thick enough to be mechanically sound and to embed the retaining pins, to be hereinafter described, a sufficient depth within it to support its own weight.

The metal wall has fixed to its interior surface a plurality of pin members sufficiently long to extend through the soft insulating material and into the layer of monolithic insulating material. The pins may be fixed to the metal wall in any suitable manner such as by bolting, welding, etc., and are preferably welded to the interior face of the wall. It is preferred that the pin members are split pins which extend through the soft material in a straight condition and are then spread so that the monolithic material will be more firmly fixed to the wall. The pin members, however, may take on many forms and may be in the shape of staples, U-shaped members, ribbons, bands, etc. It is preferred that the length of the pin member be adjusted so that it terminates well within the monolithic layer but sufficiently far from the outside face of it so that it will not conduct large quantities of heat directly to the metal shell.

Figure 3:
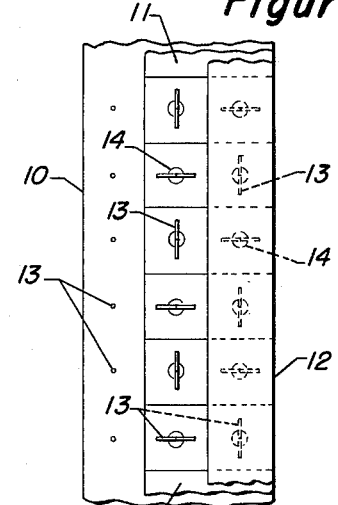
Figure 4:
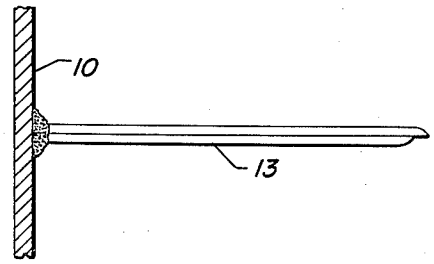
Figure 5:
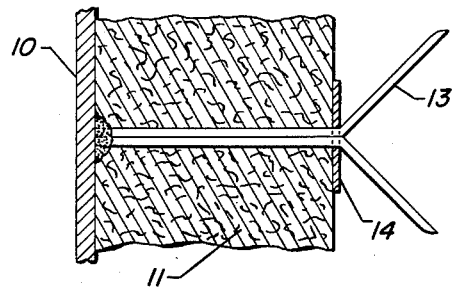

The insulated chamber of this invention may be better described with reference to the accompanying drawing which shows in FIGURE 1 a partial plan view of one embodiment of this invention, in FIGURE 2 a sectional elevation view, in FIGURE 3 a partial elevation view, in FIGURE 4 an enlarged partial sectional view of the metal wall and pin portions of the assembly and in FIGURE 5 an enlarged partial elevation view of the metal wall, pin and soft insulation portion of the assembly.

Referring to FIGURE 1, there is shown a circular cross section of an insulated chamber. Chambers of this shape are particularly useful as reactors, regenerators, and in some instances, as furnaces and it is to be understood that although the drawing illustrates a circular chamber, the invention is equally applicable to any shape. It is furthermore intended that this invention is equally applicable to low temperature and mild condition insulated chambers even though its use is most beneficial under the severe conditions heretofore described. In FIGURE 1, an exterior shell 10 which may be constructed of carbon steel and may be additionally supported with beams, columns, ribs, etc. depending upon the stresses involved, has welded to it a plurality of split pin members 13. Soft insulating material 11 is pressed into contact with the inside of steel shell 10 so that pin members 13 penetrate entirely therethrough. Pin members 13 are then, in the embodiment, spread and monolithic insulating material 12 is applied so that the spread portion of the pin members is entirely embedded in the monolithic material. The chamber of FIGURE 1 may be symmetrical about the center line and may be cylindrical in shape, being closed at the top and bottom by such closures as dished heads, flat heads, etc. The heads may be insulated identically to the cylindrical shell portion so as to form an entirely uniform monolithic interior for the vessel. The major dimensions of the chamber are unlimited by this invention and, in fact, the use of this invention is most beneficial in larger chambers since the weight reduction of the insulation by using a layer of light-weight material is more beneficial in large dimension chambers than in small.

Figure 2:
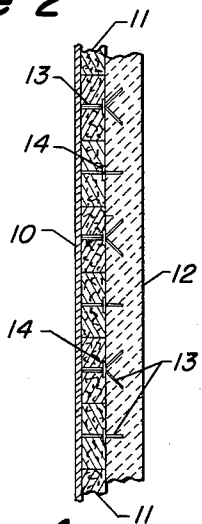

Referring to FIGURE 2, there is illustrated a partial sectional view of the wall of the vessel. In FIGURE 2, it is illustrated that the split pin members may be vertically disposed as well as horizontally disposed preferably at regular intervals so that both the monolithic and the soft light-weight insulating material are evenly supported by the entire shell 10. In FIGURE 3, a partial elevation view is shown wherein a portion of the monolithic insulation is cut away to show the light-weight insulating material and a portion of the light-weight insulating material is cut away to show shell 10. In this view it may be seen that the split pin can be arranged so that they open in alternate directions and it may also be seen that the light-weight insulating material may, if desired, be applied as small dimension blocks. In FIGURE 3, the unassembled portion shows split pins 13 in unsplit condition suitable for penetrating through light-weight insulation 11. FIGURE 4 illustrates an enlarged view of an unassembled portion of shell 10 illustrated the method that split pin 13 is fixed to shell 10 by welding and in this embodiment, protrudes perpendicularly from shell 10 into the interior of the chamber. FIGURE 5 illustrates the same view in the partially assembled condition wherein light-weight insulating material 11 is impaled upon pin member 13 and the pin is split to hold the light-weight insulation in place. FIGURE 5 illustrates a particularly advantageous method of assembling wherein a washer 14 is placed around pin member 13 before the latter is spread. This embodiment not only prevents damage to light-weight material 11 and maintains it in contact with shell 10 but it prevents spreading the soft material which would provide a channel for conducting heat to the metal wall.

From the foregoing description, it is clear that the insulated chamber of this invention, which comprises the combination of a steel shell, multiple pin members, light-weight insulating material in contact with the shell member and monolithic insulating material embedding the pin member and in contact with the light-weight insulating material, provides a highly efficient insulation which is resistant to pentration by fluids, resistant to mechanical damage by solids, resistant to corrosion, light-weight, mechanically sound and unaffected by differential expansion between metal and insulation.

I claim as my invention:

1. An insulating wall comprising in combination a metal wall having split metal pin members connected thereto, a layer of soft light-weight insulating material in contact with said metal wall and impaled by said pin members, a layer of hard monolithic refractory material in continuous contact with said soft material, said split pin members extending substantially through and being imbedded in said monolithic layer and therein being only partially spread whereby to constitute the sole means of support and reinforcement for the monolithic layer.

2. The insulating wall of claim 1 further characterized in that said pin members are connected to said metal wall at regular intervals to form a plurality of parallel rows.

3. The insulating wall of claim 1 further characterized in that said soft insulating material comprises a mineral wool.

4. The insulating wall of claim 1 further characterized in that each of said split pin members extends through a washer member in contact with said soft layer, that portion of the pin which lies within the soft layer being unspread.

5. The insulating wall of claim 4 further characterized in that said split pin members are connected to said metal wall at regular intervals to form a plurality of parallel rows and spread portions of the respective split pin members lie in planes which are disposed in alternating perpendicular relationship.

References Cited in the file of this patent
UNITED STATES PATENTS

| | | |
|---|---|---|
| 1,955,443 | Spafford | Apr. 17, 1934 |
| 2,078,753 | Christenson et al. | Apr. 27, 1937 |
| 2,223,215 | Kunz et al. | Nov. 26, 1940 |
| 2,321,813 | Henzel | June 15, 1943 |

FOREIGN PATENTS

| | | |
|---|---|---|
| 532,010 | Great Britain | 1941 |